United States Patent [19]

Takahashi

[11] Patent Number: 4,931,988
[45] Date of Patent: Jun. 5, 1990

[54] COMMUNICATION APPARATUS WITH A REMOTELY ADJUSTABLE SIGNAL LEVEL FUNCTION

[75] Inventor: Masakatsu Takahashi, Chigasaki, Japan

[73] Assignee: Ricoh Company, Ltd., Japan

[21] Appl. No.: 123,643

[22] Filed: Nov. 17, 1987

[30] Foreign Application Priority Data

Nov. 19, 1986 [JP] Japan ............................... 61-274159
Nov. 19, 1986 [JP] Japan ............................... 61-274160

[51] Int. Cl.$^5$ ............................................. G06F 1/00
[52] U.S. Cl. ..................................... 364/900; 364/919;
364/919.1; 364/919.4; 364/932.8; 364/951.1;
364/951.4
[58] Field of Search ... 364/200 MS File, 900 MS File

[56] References Cited

U.S. PATENT DOCUMENTS

| | | | |
|---|---|---|---|
| 4,147,900 | 4/1979 | Gaetano et al. | 330/138 |
| 4,154,988 | 5/1979 | Fechalos et al. | 379/189 |
| 4,319,184 | 3/1984 | Kowalczyk | 323/354 |
| 4,468,607 | 8/1984 | Tanaka et al. | 323/354 |
| 4,484,295 | 11/1984 | Bedard et al. | 323/354 |
| 4,512,033 | 4/1985 | Schrock | 340/531 |
| 4,733,303 | 3/1988 | Koshiishi | 358/257 |
| 4,736,249 | 4/1988 | Iizuka et al. | 358/257 |

Primary Examiner—Raulfe B. Zache
Attorney, Agent, or Firm—Mason, Fenwick & Lawrence

[57] ABSTRACT

A communication control system of a communication apparatus, such as a facsimile machine, which uses an analog communication network, such as the public telephone network, includes setting means for setting a signal transmitting level in accordance with information supplied from another communication apparatus connected through the analog communication network. In addition, the communication control system also includes setting means for setting a signal receiving level in accordance with information supplied from another communication apparatus connected through the analog communication network.

17 Claims, 4 Drawing Sheets

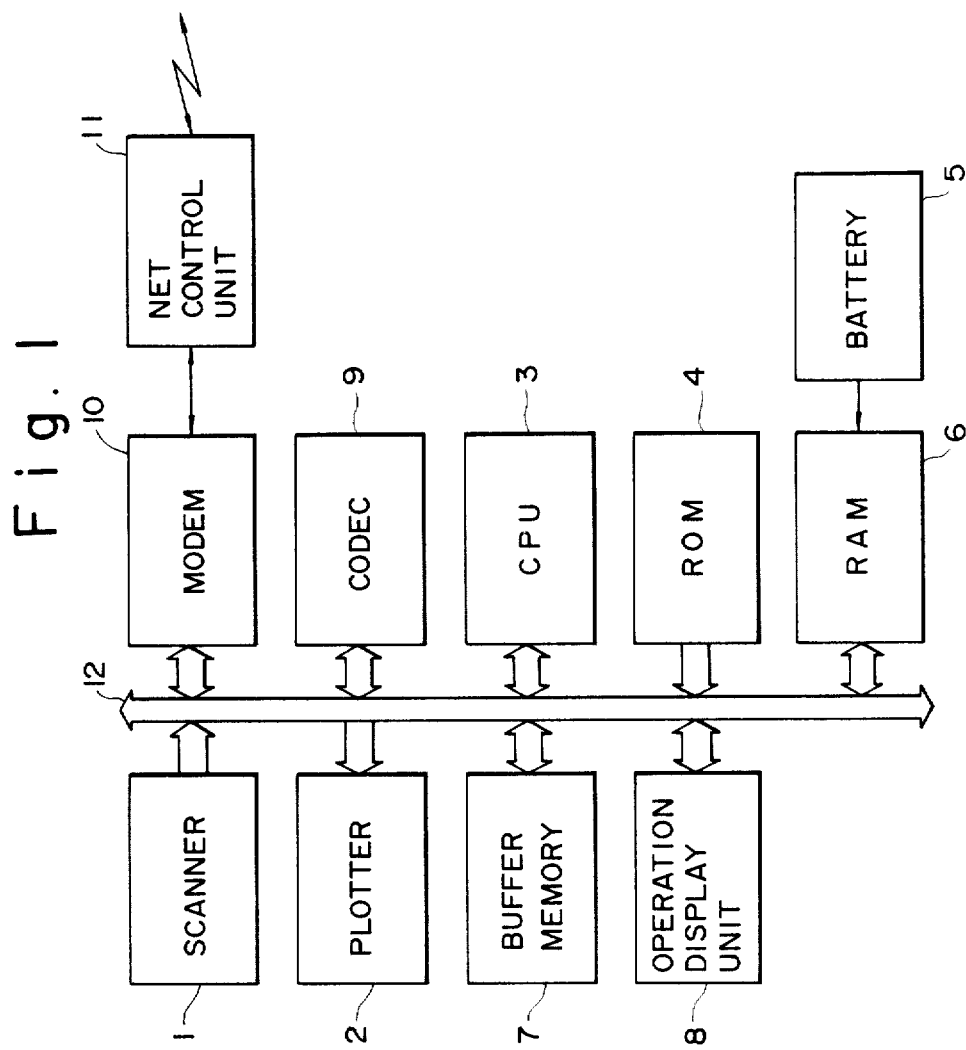

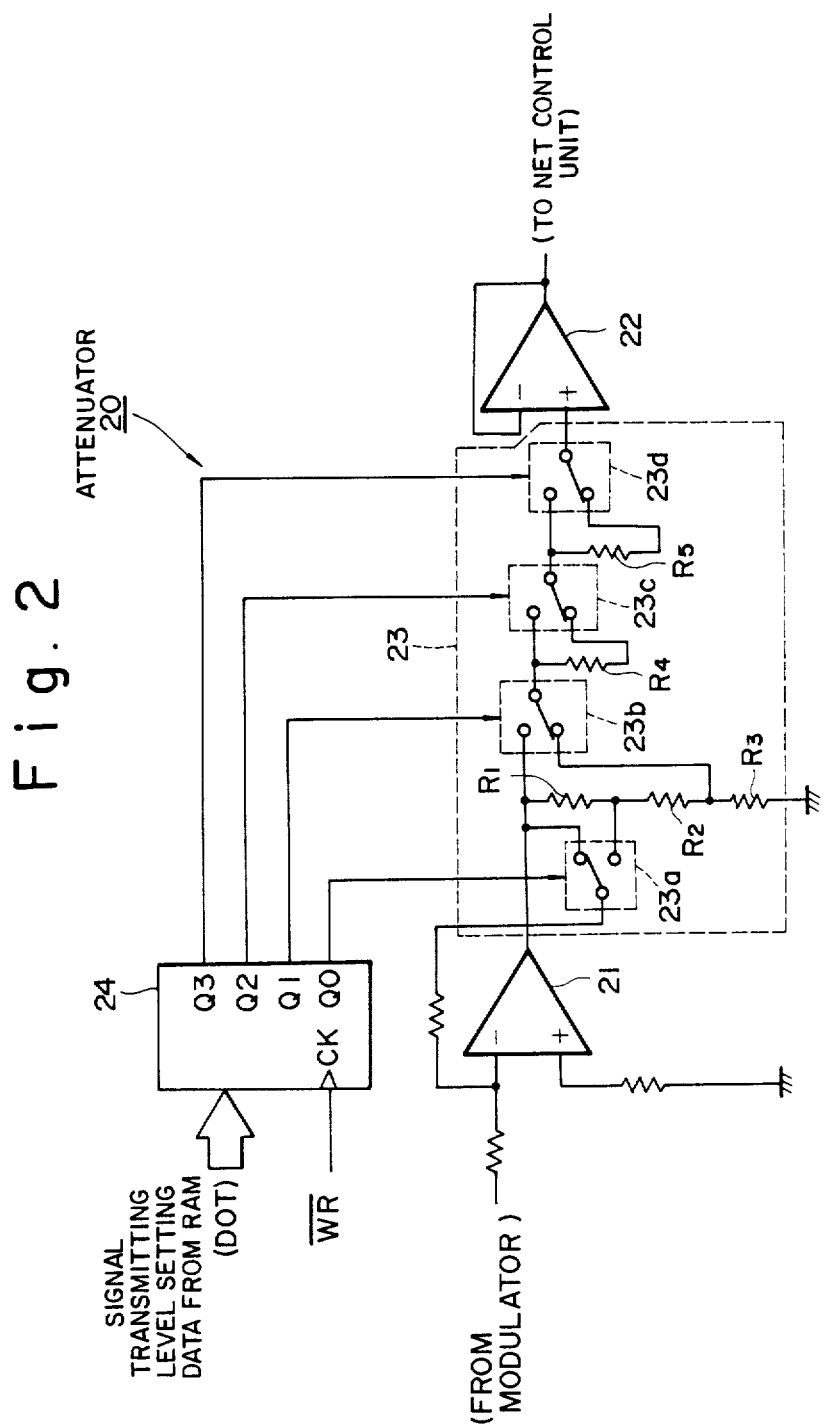

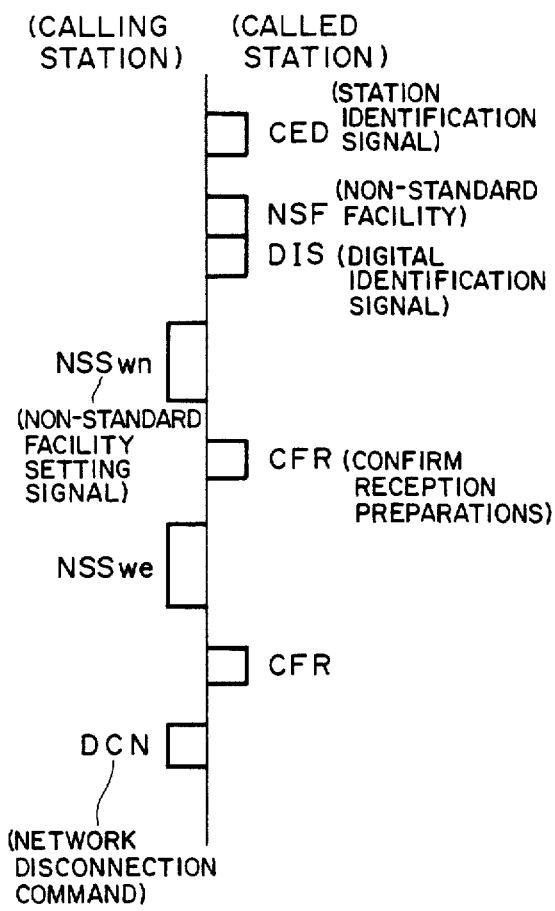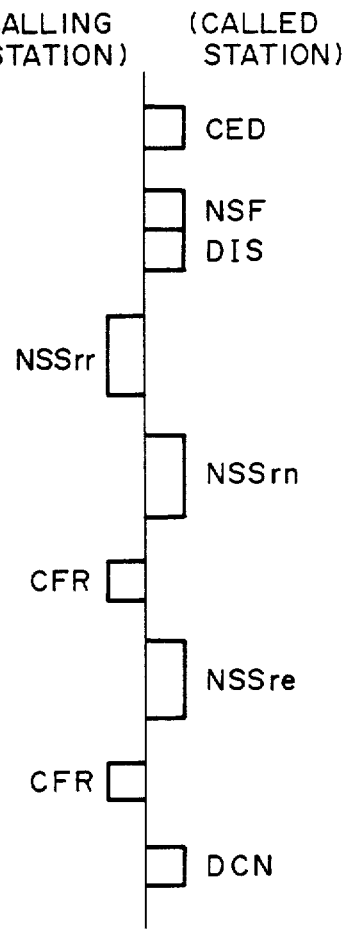

COMMUNICATION APPARATUS WITH A REMOTELY ADJUSTABLE SIGNAL LEVEL FUNCTION

BACKGROUND OF THE INVENTION

1. Field of the Invention

This invention generally relates to a communication apparatus which uses an analog transmission line, such as the public telephone network, for transmission of data, and, in particular, to a facsimile machine whose signal level can be adjusted remotely.

2. Description of the Prior Art

A communication apparatus, such as a facsimile machine, uses the public telephone network, which is an analog transmission network, for communication of data between two stations. In such a communication apparatus, it is necessary to supply a signal having a level corresponding to a loss of the network to which connection is established. For example, if a signal output from a transmitter has a signal level which is relatively small as compared with the network loss, a receiver cannot receive a signal of sufficient level from the transmitter through the network, so that a proper data communication cannot be carried out. For this reason, in a prior art facsimile machine, a plurality of terminals for setting the level of a signal to be output into the network are provided, and the signal output level is adjusted by using a jumper line or the like for the terminals. However, in such a prior art structure, a skilled service person is required for adjusting the signal level, so that it is cumbersome and time consuming.

On the other hand, in the case where a facsimile operates as a receiver, the level of a signal received from a transmitter through the network must be within a predetermined range. That is, if it is allowed to receive a signal very low in level, then even noises may be received by the receiver, which could cause an erroneous receiving operation. Thus, it is necessary to set a lower limit for the level of a signal to be received. In addition, in some countries, it is forbidden to receive signals having certain levels, so that it is necessary to suitably adjust the minimum level for receiving signals in accordance with the regulations of these countries. In this manner, since it is required to change the signal level for reception, a prior art facsimile machine is typically provided with a plurality of terminals for setting the signal level for reception. Thus, by using a jumper line or the like, the signal level for reception can be suitably adjusted. However, with this prior art structure, a skilled service person is required for adjusting the signal level for reception, which is cumbersome and time consuming.

SUMMARY OF THE INVENTION

In accordance with the principle of the present invention, there is provided a communication apparatus in which signal level setting means capable of setting a signal level in multiple levels is provided. The signal level setting means sets the signal level suitably in response to a command received from another communication apparatus through a transmission line. The communication apparatus may have a signal transmitting function or a signal receiving function, or both.

It is therefore a primary object of the present invention to obviate the disadvantages of the prior art as described above and to provide an improved communication apparatus capable of adjusting the signal level remotely.

Another object of the present invention is to provide an improved communication apparatus which uses an analog transmission line and which is provided with a function for suitably adjusting the signal level automatically.

A further object of the present invention is to provide a facsimile transmitter capable of suitably adjusting the level of a signal to be transmitted to a receiver in accordance with a command received from the receiver through a communication network.

A still further object of the present invention is to provide a facsimile receiver capable of suitably adjusting the level of a signal to be received from a transmitter in accordance with a command received from the transmitter through a communication network.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram showing the overall structure of a facsimile machine constructed in accordance with one embodiment of the present invention;

FIG. 2 is a circuit diagram showing an attenuator which may be preferably incorporated into the structure shown in FIG. 1;

FIG. 3 is a schematic illustration showing one example of a procedure for varying the level of a signal to be transmitted;

FIG. 4 is a schematic illustration showing one example of a procedure for transmitting a set value of a signal level.

DESCRIPTION OF THE PREFERRED EMBODIMENTS

Figure 5:
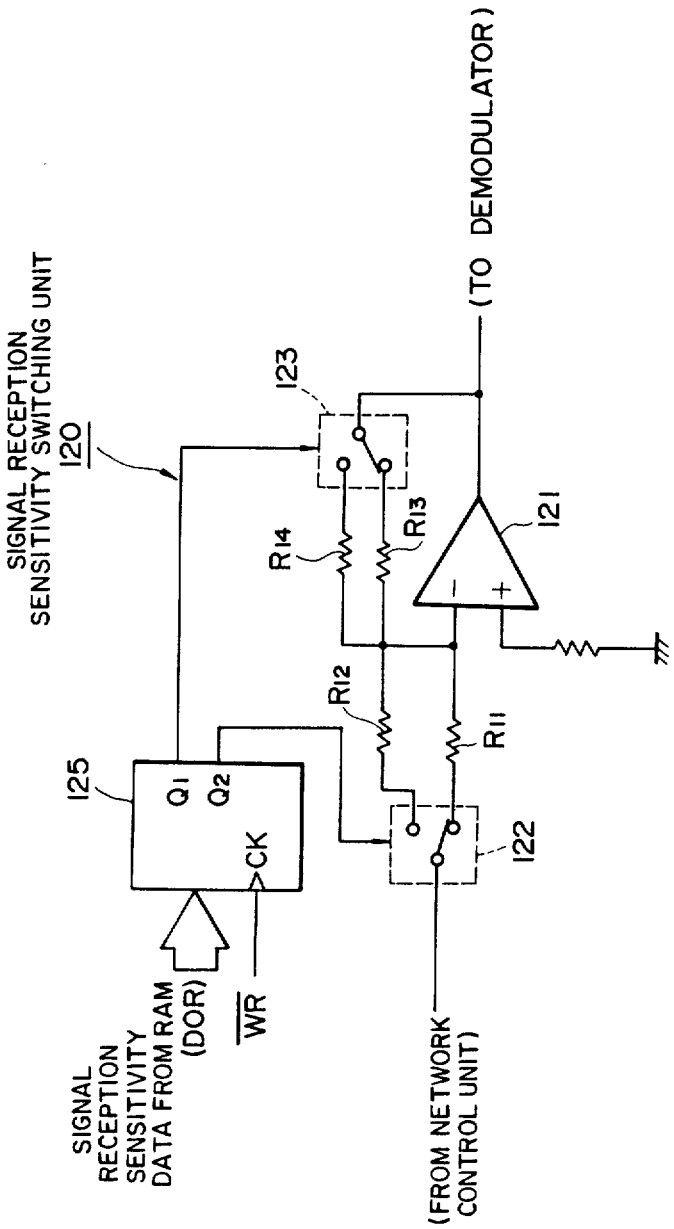
FIG. 5 is a circuit diagram showing a reception sensitivity setting unit which may be preferably incorporated into the structure shown in FIG. 1.

Referring now to FIG. 1, there is schematically shown in block form a facsimile machine constructed in accordance with one embodiment of the present invention. It is to be noted that the illustrated facsimile machine may function either as a transmitter or as a receiver. As shown, the facsimile machine includes a scanner 1 for optically reading an original image to be transmitted at a predetermined resolution and a plotter 2 for recording image information at a predetermined resolution. Also provided is a central processing unit or simply CPU 3 which is in charge of the overall control of the present facsimile machine and also executes a predetermined communication control procedure in accordance with a program stored in a read only memory or simply ROM 4. And, a random access memory or simply RAM 6 having a back-up battery 5 is also provided. It is to be noted that a non-volatile semiconductor memory may be provided in place of RAM 6, if desired.

A buffer memory 7 is also provided for temporarily storing a data to be transmitted or received. An operation display unit 8 is provided with various operation keys and display devices for displaying various operational guidance information, and the operation display unit 8 constitutes an interface between the operator and the facsimile machine, so that the operator can input various information and commands to cause the present facsimile machine to operation in a desired mode. For this purpose, the operation keys includes such keys as a mode key for setting the operational mode and various guidance keys for making selection in accordance with guidance information displayed.

The facsimile machine also includes a codec (coder/decoder) 9 for coding original image data to have the image data compressed before transmission and for decoding compressed data to restore the compressed data to the original image data. Also provided is a MODEM 10 for modulating and demodulating data so as to allow to use the public telephone network, which is an analog network, as a transmission network. A net control unit 11 is also provided for connecting the present facsimile machine to the public telephone network. The net control unit 11 is provided with an automatic call placing and receiving function.

As shown in FIG. 1, the scanner 1, plotter 2, CPU 3, ROM 4, RAM 6, buffer memory 7, operation display unit 8, codec 9, and MODEM 10 are all connected to a bus line 12, so that data is transmitted among those elements through the bus line 12.

In accordance with one aspect of the present invention, the MODEM 10 is provided with an attenuator 20 for varying the level of a signal to be output for transmission and one example of such an attenuator is illustrated in FIG. 2. As shown, the illustrated attenuator 20 includes an operational amplifier 21 for receiving an output signal from the MODEM 10 at its inverting input terminal, a buffer amplifier 22 for sending a signal to the net control unit 11, an attenuating network 23 interposed between the operational amplifier 21 and the buffer amplifier 22 for attenuating the level of a signal, and a register 24 for storing data to set the amount of attenuation at the attenuating network 23. The attenuating network 23 includes a plurality of analog switches 23a, 23b, 23c, and 23d, and a weighted voltage divider comprised of resistors R1, R2, R3, R4, and R5. The analog switches 23a, 23b, 23c, and 23d are respectively turned on and off by respective output data from the register 24, whereby the amount of attenuation for the attenuating network 23 is set to determine the level of a signal to be output from the attenuator 20. For example, when the analog switches 23a, 23b, 23c, and 23d are progressively turned on in the order mentioned, the amount of attenuation obtained increases in the order of 1dB, 2dB, 4dB, and 8dB. As a result, in the illustrated embodiment, the amount of attenuation can be set in one of 16 different levels by turning on one or more of the analog switches 23a, 23b, 23c, and 23d selectively.

On the other hand, the register 24 stores a signal transmitting level setting data (i.e., data for setting the level of a signal to be transmitted or output) DOT supplied from the CPU 3 at the timing when a write signal $\overline{WR}$ has been output. The signal transmitting level setting data DOT is stored in a predetermined memory region of the RAM 6. And, when the facsimile machine is turned on or the contents of the memory region of the RAM 6 where the signal transmitting level setting data DOT is stored have been rewritten, under the control of the CPU 3, the signal transmitting level setting data DOT stored in the RAM 6 is read out and written into the register 24.

With the above-described structure, in order to change the signal transmitting level in the present facsimile machine, i.e., level of a signal to be transmitted or output from the present facsimile machine, it is only necessary to alter or rewrite the contents of the memory region of the RAM 6, which indicate the signal transmitting level setting data DOT. Under the condition, in the present embodiment, it is so structured that the signal transmitting level can be altered by an external device. For example, the contents of the memory region for storing the signal transmitting level setting data DOT of the RAM 6 of the present facsimile machine can be altered by an external device, such as a center station of service stations. In addition, it is so structured that the contents of the memory region of the RAM 6 which store the signal transmitting level setting data DOT of the present facsimile machine can be read out as desired so that the stored signal transmitting level setting data DOT can be read by an external device.

In this case, however, it is to be noted that an external device should have the same structure as that of the present facsimile machine. It is also so structured that the function of freely accessing the RAM 6 of another facsimile machine can be prohibited appropriately, and, thus, it can be so set that only a predetermined station, such as a center station, has an access to the RAM 6 of the present facsimile machine.

When the center station of service stations changes the signal transmitting level of a user's facsimile machine (hereinafter, referred to as a "user station") upon request from a user, the center station, in the first place, calls the user station as shown in FIG. 3. Then, the user station responds by sending a called station identification signal CED and then sends a non-standard facility signal NSF and a digital identification signal DIS to the center station. If the non-standard facility signal NSF indicates the fact that the called station has a function of rewriting the contents of the RAM 6 for the signal transmitting level setting data DOT, the center station sends a non-standard facility setting signal NSSwn, which indicates to alter or rewrite the memory contents of the RAM 6 and also to maintain the altered memory contents for the following operation, together with an address data indicating the memory region of the RAM 6 to be rewritten and a data to be rewritten, to the user station.

Then, at the user station, the data at the memory region of the RAM 6 which is indicated by the address data added to the received non-standard facility setting signal NSSwn is rewritten by the data supplied as added to the signal NSSwn. And, then, the user station sends a reception preparation confirmation signal CFR to the center station. Upon receipt of this reception preparation confirmation signal CFR, the center station sends another non-standard facility setting signal NSSwn in a manner similar to that described above if the rewriting of the signal transmitting level setting data continues; on the other hand, if the final data for rewriting is to be sent, the center station sends to the user station a non-standard facility setting signal NSSwe, which indicates the fact that the memory contents of the RAM 6 are to be rewritten and this rewriting operation is to be completed, with the addition of an address data indicating the memory region of the RAM 6 which is to be rewritten and a data to be rewritten thereby. And, upon completion of transmission of all of the data to be rewritten, a network disconnection command DCN is transmitted to restore the network.

In this manner, using the non-standard facility setting signals NSSwn and NSSwe, the contents of the memory region of the RAM 6 where the signal transmitting level setting data DOT is stored are rewritten, so that the signal transmitting level of a user station can be altered as desired by the center station. It is to be noted, however, that in place of the reception confirmation signal CFR in the above-described procedure, use may also be made of a train failure signal FTT.

On the other hand, a procedure when the center station is to confirm the signal transmitting level of a user station is illustrated in FIG. 4. In this case, as shown, the center station, in the first place, calls a user station. Then, the user station responds by sending a called station identification signal CED and then sends a non-standard facility signal NSF and a digital identification signal DIS to the center station. If the non-standard facility signal NSF received indicates the fact that the user station has a function of transmitting the memory contents of the RAM 6, the center station sends to the user station a non-standard facility setting signal NSSrr, which requests to transmit the memory contents of the RAM 6, with the addition of beginning and ending address data of the memory region containing the requested memory contents.

Accordingly, the user station transmits the data stored in the memory region defined by the beginning and ending address data added to the received non-standard facility setting signal NSSrr to the center station address by address in sequence using non-standard facility setting signals NSSrn and NSSre. Here, the non-standard facility setting signal NSSrn is used if there is remaining data to be transmitted in succession; on the other hand, the non-standard facility setting signal NSSre is used if the data of the ending address is to be transmitted.

In this manner, every time when the non-standard facility setting signal NSSrn or NSSre has been transmitted, the center station sends a reception preparation confirmation signal CFR to the user station. Upon completion of transmission of all of the data to be rewritten, the user station sends a network disconnection command DCN to restore the network. Accordingly, by selecting the memory region of the RAM 6 which stores the signal transmitting level setting data DOT using the non-standard facility setting signal NSSrr, the signal transmitting level of the user station can be confirmed by the center station. As an alternative, in place of the reception preparation confirmation signal CF in the above-described procedure, use may be made of a train failure signal FTT, if desired.

As described above, in accordance with the present embodiment, the center station can alter or confirm the signal transmitting level of the user station so that the procedure of altering the signal transmitting level of a facsimile machine can be carried out speedily and easily. It is to be noted that the attenuator 20 of the above-described embodiment allows to alter the amount of attenuation, i.e., level of transmitting a signal, in 16 different levels; however, the signal level may be varied less or more as desired. In addition, the attenuator 20 may be incorporated in the net control unit 11 instead of the MODEM 10 as in the above-described embodiment.

Now another aspect of the present invention will be described with particular reference to FIG. 5. This aspect of the present invention is to provide a facsimile machine which is provided with signal receiving level setting means for setting the level of a signal to be received from a transmitter in accordance with a command from another facsimile machine connected through a transmission line, such as the public telephone network. A facsimile machine incorporating the signal receiving level setting means in accordance with this aspect of the present invention may have the overall structure shown in FIG. 1. The MODEM 10 of the facsimile machine shown in FIG. 1 constructed in accordance with this aspect of the present invention includes a signal reception sensitivity switching unit 120 for changing the level of a signal to be received and one embodiment of such a signal reception sensitivity switching unit is schematically shown in FIG. 5.

As shown in FIG. 5, the signal reception sensitivity switching unit 120 includes an operational amplifier 121, an analog switch 122 for switching an input resistance of the operational amplifier 121 to a reception signal from the network control unit 11 to either one of resistors R11 and R12, an analog switch 123 for switching a feedback resistance of the operational amplifier 121 to either one of resistors R13 and R14, and a register 125 for storing an on/off data for controlling the on/off condition of each of the analog switches 122 and 123. And, an output signal from the operational amplifier 121 is supplied to the MODEM 10.

The register 125 receives and stores a signal reception sensitivity setting data DOR from the CPU 3 at the timing of outputting of a write signal $\overline{WR}$. The signal sensitivity setting data DOR is stored in a predetermined memory region of the RAM 6. And, under the control of the CPU 3, when the present facsimile machine has been turned on or the contents of the memory region of the RAM 6 for storing the signal reception sensitivity setting data DOR have been rewritten, the signal sensitivity setting data DOR stored in the RAM 6 is read out from the RAM 6 and written into the register 125. Accordingly, in this case, the reception sensitivity switching unit 120 can vary the signal reception sensitivity in four different levels.

In order to alter the signal reception sensitivity of the present facsimile machine, it is only necessary to alter the contents of the memory region of the RAM 6 for storing the reception sensitivity setting data DOR. Under the condition, in the present embodiment, it is so structured that an external device, e.g., a center station of service stations, can rewrite or alter the contents of the memory region of the RAM 6 of the present facsimile machine, so that the signal reception sensitivity can be altered or rewritten by an external device, such as the center station. In addition, it is also so structured that the contents of the memory region of the RAM 6 of the present facsimile machine can be read by an external device, such as the center station.

The manner of rewriting the contents of the memory region of the RAM 6 and of detecting or confirming the contents of the memory region of the RAM 6 can be carried out similarly with the manner described with respect to the attenuator 20 of FIG. 2 with reference to FIGS. 3 and 4. Thus, the description of implementing the rewriting operation and detecting or confirming operation will not be repeated here. It is to be noted that the signal reception sensitivity level can be set at one of four different levels in the above-described embodiment; however, the number of levels may be set less than or more than four levels, as desired. In addition, the reception sensitivity switching unit 120 may be incorporated into the net control unit 11 instead of the MODEM 10 as in the above-described embodiment.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims. For example, each of the signal transmitting level setting unit and the signal reception sensitivity setting unit may be applied to any other communication apparatus than a facsimile machine.

What is claimed is:

1. A communication control system for use in a communication apparatus which uses an analog communication network as a transmission line, comprising:
   first storing means for temporarily storing a first signal to be transmitted;
   transmitting means, connected to said first storing means, for transmitting said first signal stored in said first storing means;
   first setting means, connected to or comprising a portion of said transmitting means, for setting a first signal level at which said transmitting means transmits said first signal in accordance with first information supplied through said analog communication network from another communication apparatus which is connected to said communication apparatus through said analog communication network;
   receiving means for receiving a second signal transmitted from another communication apparatus through said analog communication network;
   said first storing means, connected to said receiving means, also for storing said second signal received by said receiving means; and
   second setting means, connected to or comprising a portion of said receiving means, for setting a second signal level to be used by said receiving means in receiving said second signal in accordance with second information supplied through said analog communication network from said another communication apparatus which is connected to said communication apparatus through said analog communication network.

2. The system of claim 1 wherein said first storing means also stores said first and second signal levels set by said first and second setting means.

3. The system of claim 2, further comprising:
   a central processing unit, operatively connected to said first and second setting means; and
   second storing means, operatively connected to said central processing unit, for storing a program to be executed by said central processing unit.

4. The system of claim 3 wherein said first storing means includes a random access memory and said second storing means includes a read only memory.

5. The system of claim 1 wherein said first setting means includes an attenuator capable of setting one of a predetermined number of attenuating levels in transmitting said first signal by said transmitting means.

6. The system of claim 5 wherein said attenuator includes:
   an operation amplifier comprising an output;
   a buffer amplifier comprising an input; and
   resistance adjusting means connected between said operational amplifier output and said buffer amplifier input, for adjusting a resistance between said operational amplifier output and said buffer amplifier input.

7. The system of claim 6 wherein said resistance adjusting means includes:
   a plurality of resistors; and
   at least one switch, connected to said resistors, for selecting connecting said resistors between said operational amplifier output and said buffer amplifier input.

8. The system of claim 1 wherein said second setting means includes a signal reception sensitivity switching unit capable of setting one of a predetermined number of signal reception sensitivity levels.

9. The system of claim 8 wherein said signal reception sensitivity switching unit includes:
   an operational amplifier having an input resistance present at an input to said operational amplifier; and
   input resistance adjusting means for adjusting said input resistance to said operational amplifier.

10. The system of claim 9 wherein said input resistance adjusting means includes:
    a plurality of resistors; and
    at least one switch for selectively connecting said resistors to said input of said operational amplifier.

11. A communication control system for use in a communication apparatus which uses an analog communication network as a transmission line, comprising:
    receiving means for receiving a signal transmitted from another communication apparatus through said analog communication network;
    first storing means, connected to said receiving means, for storing said signal received by said receiving means; and
    setting means, connected to or comprising a portion of said receiving means, for setting a signal level to be used by said receiving means in receiving said signal in accordance with information supplied through said analog communication network from another communication apparatus which is connected to said communication apparatus through said analog communication network.

12. The system of claim 11 wherein said first storing means also stores said signal level set by said setting means.

13. The system of claim 12, further comprising:
    a central processing unit, operatively connected to setting means; and
    second storing means, operatively connected to said central processing unit, for storing a program to be executed by said central processing unit.

14. The system of claim 13 wherein said first storing means includes a random access memory and said second storing means includes a read only memory.

15. The system of claim 11 wherein said setting means includes a signal reception sensitivity switching unit capable of setting one of a predetermined number of signal reception sensitivity levels.

16. The system of claim 15 wherein said signal reception sensitivity switching unit includes:
    an operational amplifier having an input resistance present at an input to said operational amplifier; and
    input resistance adjusting means for adjusting said input resistance to said operational amplifier.

17. The system of claim 16 wherein said input resistance adjusting means includes:
    a plurality of resistors; and
    at least one switch for selectively connecting said resistors to said input of said operational amplifier.

* * * * *